(12) United States Patent
Pisal et al.

(10) Patent No.: US 12,524,170 B2
(45) Date of Patent: Jan. 13, 2026

(54) COMPUTATIONAL STORAGE WITH CONFIGURABLE DRIVES

(71) Applicant: Seagate Technology LLC, Fremont, CA (US)

(72) Inventors: Avinash Suresh Pisal, Pune (IN); Rajesh Maruti Bhagwat, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/777,218

(22) Filed: Jul. 18, 2024

(65) Prior Publication Data

US 2025/0028460 A1  Jan. 23, 2025

Related U.S. Application Data

(60) Provisional application No. 63/514,506, filed on Jul. 19, 2023.

(51) Int. Cl.
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,762,764 B1* | 9/2023 | Kirkpatrick | ........... | G06F 3/0619 711/202 |
| 12,393,845 B2* | 8/2025 | Rom | ........... | G06N 3/04 |
| 2024/0118830 A1* | 4/2024 | Murphy | ........... | G06F 3/067 |
| 2024/0193177 A1* | 6/2024 | Cardente | ........... | G06F 16/258 |
| 2024/0296254 A1* | 9/2024 | Askerov | ........... | G06F 21/76 |
| 2024/0370172 A1* | 11/2024 | Sajeepa | ........... | G06F 3/0614 |

OTHER PUBLICATIONS

C. Bobda et al. 2022. The Future of FPGA Acceleration in Datacenters and the Cloud. ACM Trans. Reconfigurable Technol. Syst. 15, 3, Article 34 (Sep. 2022), 42 pages. (Year: 2022).*
R. Niwase, H. Harasawa, Y. Yamaguchi, W. Kaijie and H. Amano, "A cost/power efficient storage system with directly connected FPGA and SATA disks," 2023 IEEE 16th International Symposium on Embedded Multicore/Many-core Systems-on-Chip (MCSoC), Singapore, 2023, pp. 51-58. (Year: 2023).*
Li, G., Chen, X., Li, S., Ma, B. and Song, Z. (2020), FPGA-Enhanced Data Processing System Using PCM Technology. Chinese J. Electron., 29: 766-771. (Year: 2020).*

* cited by examiner

*Primary Examiner* — Edward J Dudek, Jr.
*Assistant Examiner* — Ralph A Verderamo, III
(74) *Attorney, Agent, or Firm* — HOLZER PATEL DRENNAN

(57) ABSTRACT

The system disclosed herein includes one or more storage drives, an FPGA based controller board, and a flash memory configured to store one or more FPGA executable binary libraries. The FPGA based controller board may include a drive logic detector configured to detect the type of the one or more of the storage drives and an FPGA executable libraries configuration module configured to select one or more of the FPGA executable binary libraries from the flash memory based on the type of the one or more of the storage drives to implement an FPGA based interface for communication between the one or more storage drives and a host.

20 Claims, 10 Drawing Sheets

COMPUTATIONAL STORAGE WITH CONFIGURABLE DRIVES

CROSS-REFERENCE TO RELATED APPLICATIONS

This application is a non-provisional application based on and claims benefit of priority to U.S. provisional patent application No. 63/514,506 filed on Jul. 19, 2023, and entitled Computational Storage with Configurable Drives, which is incorporated herein by reference in its entireties.

BACKGROUND

The amount of data being generated is exploding. According to analysts, the volume of data created, captured, or replicated is expected to increase to 175 zettabytes in 2025. It is becoming clear that compute centric architectures will not continue to scale, and the focus is now on generating insights from the vast volumes of data where it resides, in storage devices. Furthermore, the data is stored in various different types of storage devices that makes it difficult to access the data for meaningful analysis and insights.

SUMMARY

The system disclosed herein includes various storage drives, an FPGA based controller board, and a flash memory configured to store one or more FPGA executable binary libraries. The FPGA based controller board may include a drive logic detector configured to detect the type of the one or more of the storage drives and an FPGA executable libraries configuration module configured to select one or more of the FPGA executable binary libraries from the flash memory based on the type of the one or more of the storage drives to implement an FPGA based interface for communication between the one or more storage drives and a host.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
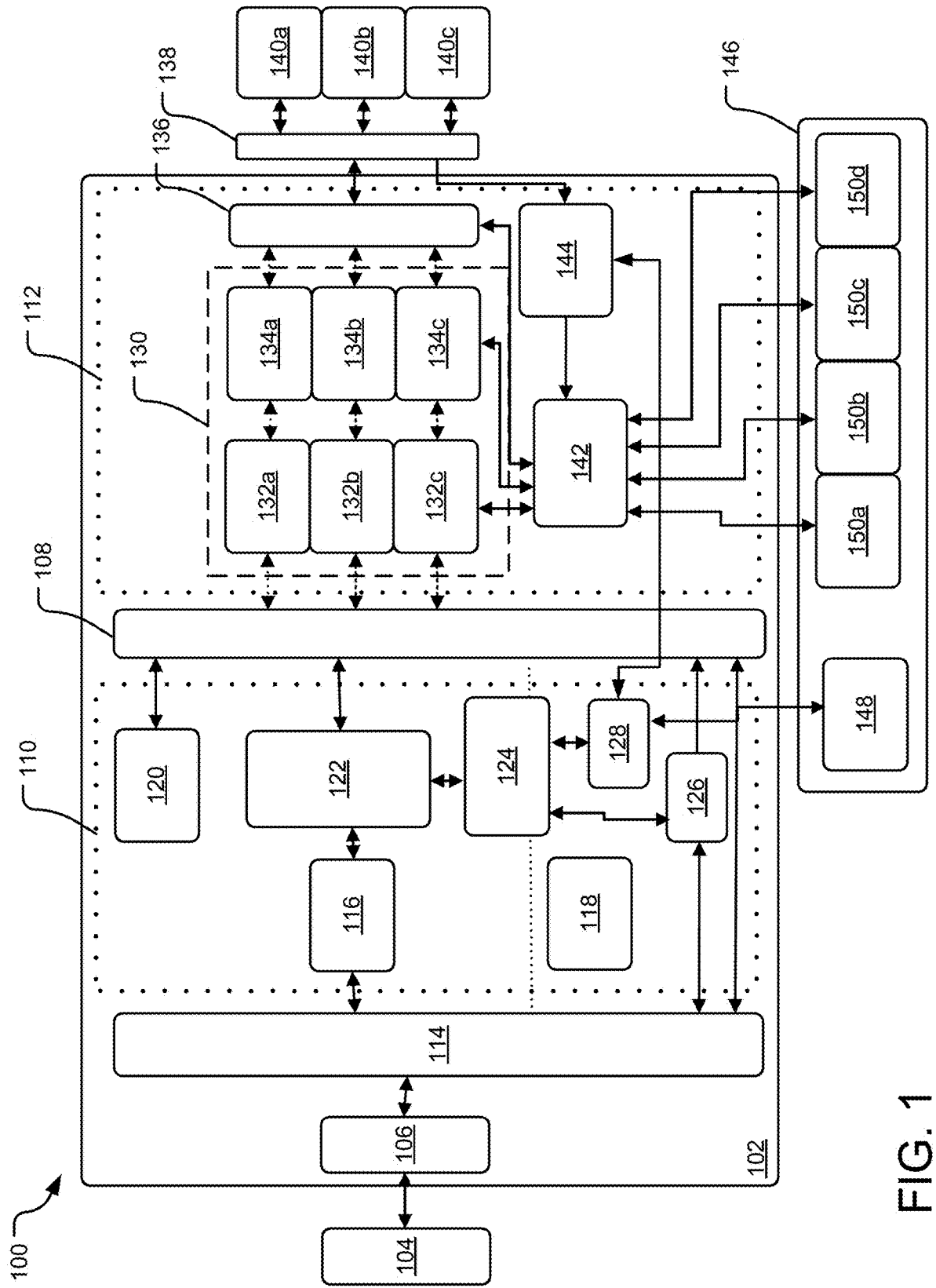
FIG. 1 illustrates an example block diagram of an FPGA based system configured to support multiple storage drives.

Storage systems for storing a large amount of data may use a number of different types of storage drives such as serially attached SCSI (SAS) drive, serial advanced technology attachment (SATA) drive, a non-volatile memory express (NVMe) drive, etc. Each of these types of storage drives may require a host controller that is different from a host controller used by other storage drive. As a result for a system to communicate with an NVMe drive may require a different hardware interface than the hardware interface required for communicating with the SAS interface. Common types of interfaces used by these storage drives include a SAS interface, a SATA interface, an NVMe interface, etc.

A computational storage device (CSD) is a storage device that provides persistent data storage and computational services. Computational storage is about coupling compute and storage to run applications locally on the data, reducing the processing required on the remote server, and reducing data movement. To do that, a processor on the drive is dedicated to processing the data directly on that drive, which allows the remote host processor to work on other tasks.

Computational storage applications using CSDs often use NVMe interface, with peripheral component interconnect express (PCIe) as the physical interface protocol. Such an implementation does not require additional or special host controller or host bus adaptor (HBA) for the host working with the NVMe interface. However, due to the storage drives using other types of interfaces, such as SAS or SATA, the host may need to support several types of host controllers or HBAs. This may result in redundant host controllers or HBAs that increases the cost and usage of the space on the host motherboards.

Implementations disclosed herein illustrates a field-programmable gate array (FPGA) based system 100 that allows a host server 104 to communicate with different types of storage drives that generally require different drive interfaces. For example, an implementation illustrated herein provides an FPGA board 102 that allows the host server 104 to communicate with a storage drives 140*a*, 140*b*, and 140*c* (together referred to as storage drives 140). Specifically, the FPGA board 102 may include a PCI bridge 106 configured to communicate with the host server 104 using a transport layer protocol such as the PCIe/NVMe protocol. Specifically, the host server 104 may not know the type of storage drive 104 that connected on the other side of the FPGA board 102 to store data. In one implementation, the PCI bridge 106 may convert PCIe transactional layer packets (TLP) into advanced extensible interface (AXI) packet and vice versa.

The PCIe bridge 106 may communicate via a PCIe interconnect 114 with NVMe components 110 to process various requests from the host server 104. In one implementation, the PCIe bridge 106 may be implemented using libraries available for implementing a PCIe bridge using FPGA components. The FPGA board 102 may include an interconnect 108 that is configured to interconnect the NVMe components 110 with an adapter 112 with various components of a reconfigurable controller for communicating with the storage drives 140. In one implementation, the interconnect 108 may be an AXI interconnect providing switching logic that helps data and control flow through various AXI buses. The interconnect 108 may also be instantiated using library of commands available to implement such an interconnect. The NVMe components 110 are configured to communicate at transport layer of TCP/IP protocol to expose capabilities of the storage drives 140 irrespective of the type of storage drives 140 being NVMe, SATA, SAS, or any combinations thereof. For example, the NVMe components 110 communicates the capacity of the storage drives 140, the vendor IDs for the storage drives 140, and any other information required by the host server 104.

The NVME components 110 may include an NVMe target controller 116 that may store data and logic to implement an NVMe target controller. For example, the NVMe target controller 116 may be implemented as NVMe target controller lite. Furthermore, the NVME components 110 may include a processing subsystem/programming logic (PS/PL) dynamic shell 118 that manages populating various dynamic computational functions as per the processing requirement coming from the host server 104.

The NVME components 110 may also include an admin queue manager 120 that may be responsible for identifying the physical storage drive and advertising its capabilities to the host server 104. The admin queue manager 120 may also takes care of other NVMe admin management functions. An NVMe to NVMe bridge 122 includes logic that decodes a namespace identifier in submission queue entry. For example, if namespace identifier is #1, the Submission queue entry is forwarded to PS/PL dynamic shell 118, which is intent for computational storage processor. Whereas if namespace identifier is #2, the submission queue entry is forwarded to the storage drive controllers 134.

Additionally, the NVME components 110 may also include an accelerator 124 that include both a PS accelerator and a PL accelerator. The accelerator 124 may work with the PS/PL dynamic shell 118 to accelerate various processes including data compression, data encoding, data decoding, etc., of the data on the storage drives 140.

Specifically, the PS accelerator may be a hard CPU subsystem on which host downloaded firmware downloaded from the host server 104 may work. For example, such firmware may be electronic Berkley packet filter (eBPF) firmware. The PL accelerator may include various additional hardware based accelerators. A controller memory buffer (CMB) 126 which may be a Apr. 8, 2016 GB of DRAM buffer available to hold the data on which processing is to be performed. The CMB 126 may store data fetched from the storage drives 140 or from the host 104. In one implementation, the CMB 126 is implemented using FPGAs and configured based on the type of the storage drive 140.

The adapter 112 includes a drive logic detector 144 that is configured to determine the type and capabilities of storage drive 140 that is connected on a bay 138 with the FPGA board 102. The adapter 112 also includes various FPGA components that may be useful for instantiating an FPGA based interface 130 that is used for communication between the interconnect 108 and the storage drives 140. Specifically, the FPGA based interface 130 may include different type of storage drive controllers 134 including either an NVMe controller 134a, a SATA controller 134b, and a SAS controller 134c. Furthermore, the FPGA based interface 130 may also include various FPGA components that may be used to instantiate controller bridges 132 that allows the interconnect 108 to communicate with the storage drive controllers 134. For example, an NVMe host controller bridge 132a allows the interconnect 108 to communicate with the NVMe controller 134a. Similarly an NVM to SATA controller bridge 132b allows the interconnect 108 to communicate with the SATA controller 134b, and an NVM to SAS controller bridge 132c allows the interconnect 108 to communicate with the SAS controller 134c.

In one implementation, the drive logic detector 144 communicates the type of the storage device 140 to the FPGA executable libraries configuration module 142. The FPGA executable libraries configuration module 142 selects one or more of the FPGA executable binary libraries 150 from a flash memory 146 based on the type of the storage drives 140 to implement the FPGA based interface 130. For example, the FPGA executable binary libraries 150 may include libraries to implement controller bridges 132 as well as libraries to implement the storage drive controllers 134.

In one implementation, the FPGA components may include static RAM, configurable logic blocks, I/O transceivers, etc. For example, the FPGA based interface 130 may communicate with a bay 138 via an FPGA based transceiver 136. The FPGA based transceiver 136 may be programmable and configured in different modes as per drive interface type.

An implementation of the FPGA board 102 may also include an acceleration library manager 128 that is configured to work with acceleration libraries 148 that may be stored on the flash memory 146. The Acceleration library manager 128 may select one or more of the acceleration libraries 148 based on the type of storage drive 140 as detected by the drive logic detector 144.

In various implementations, the FPGA based system 100 provides computational storage drive with several types of drive support drive/connector. Specifically, a sideband signal from the storage drives 140 may be used to detect drive presence and type of drive connected to the bay 138. Specifically, the drive presence detector 144 detects the bitstream from the bay 138 to determine the type of storage drive 140 and its capability. Subsequently, based on the drive type, the FPGAs implementing the FPGA based interface 130 are programmed using selected FPGA executable binary libraries 150.

Once the storage drives 140 are identified and the FPGA interface 130 is configured, the storage drives are mapped to namespace #2 of the NVMEs target controller 116. Here the namespace may indicate a collection of logical block addresses (LBAs) exposed by the NVMEs target controller 116 to the host server 104. On the other hand, namespace #1 of the NVMEs target controller 116 may be reserved for a computational storage processor (CSP) implementation using the accelerator 124. However, in the absence of detection of any storage drive 140 connected to the bay 138, only the namespace #1 is exposed. The configuration allows the host server 104 to support diverse types of drives 140 over PCIe and remove costly infrastructure required for SATA and SAS drives.

Figure 2:
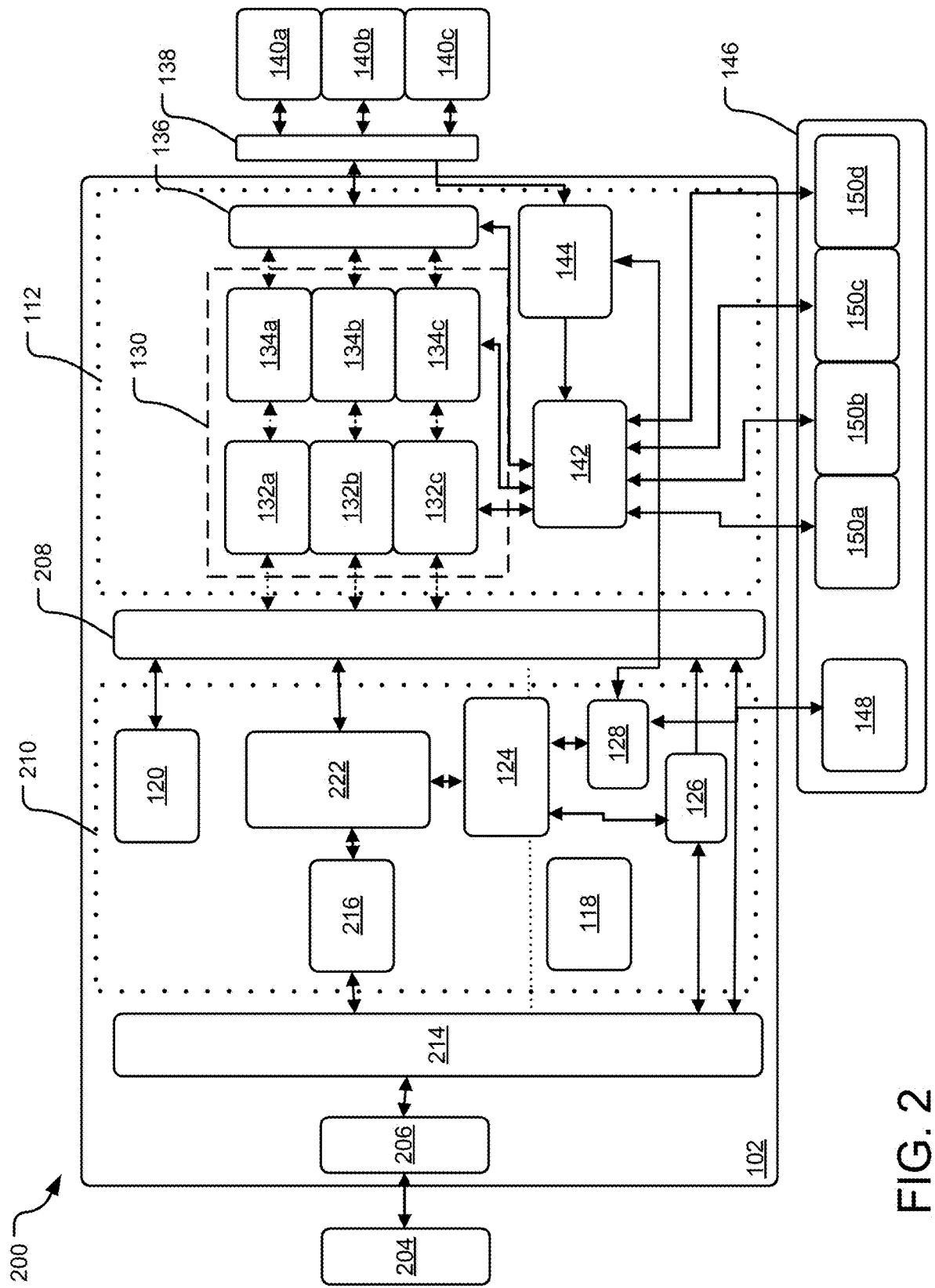
FIG. 2 illustrates an example block diagram of an alternative FPGA based system configured to support multiple storage drives.

FIG. 2 illustrates a block diagram of an alternative FPGA based system 200 configured to support multiple storage drives. One or more components of the FPGA based system 200 are similar to the components of the FPGA based system 100 and are referenced by equivalent reference numerals. The FPGA based system 200 is different from the FPGA based system 100 in that is provides an Ethernet interface towards the host 204. Specifically, the FPGA based system 200 includes an Ethernet IP bridge 206 that communicates with the host 204. The NVME components 210 includes an Ethernet TCP/IP offload engine 216 and an AXI-to-AXI bridge 222 to communicate between the interconnect 214 and 208 on the host side of the FPGA based system 200.

Figure 3:
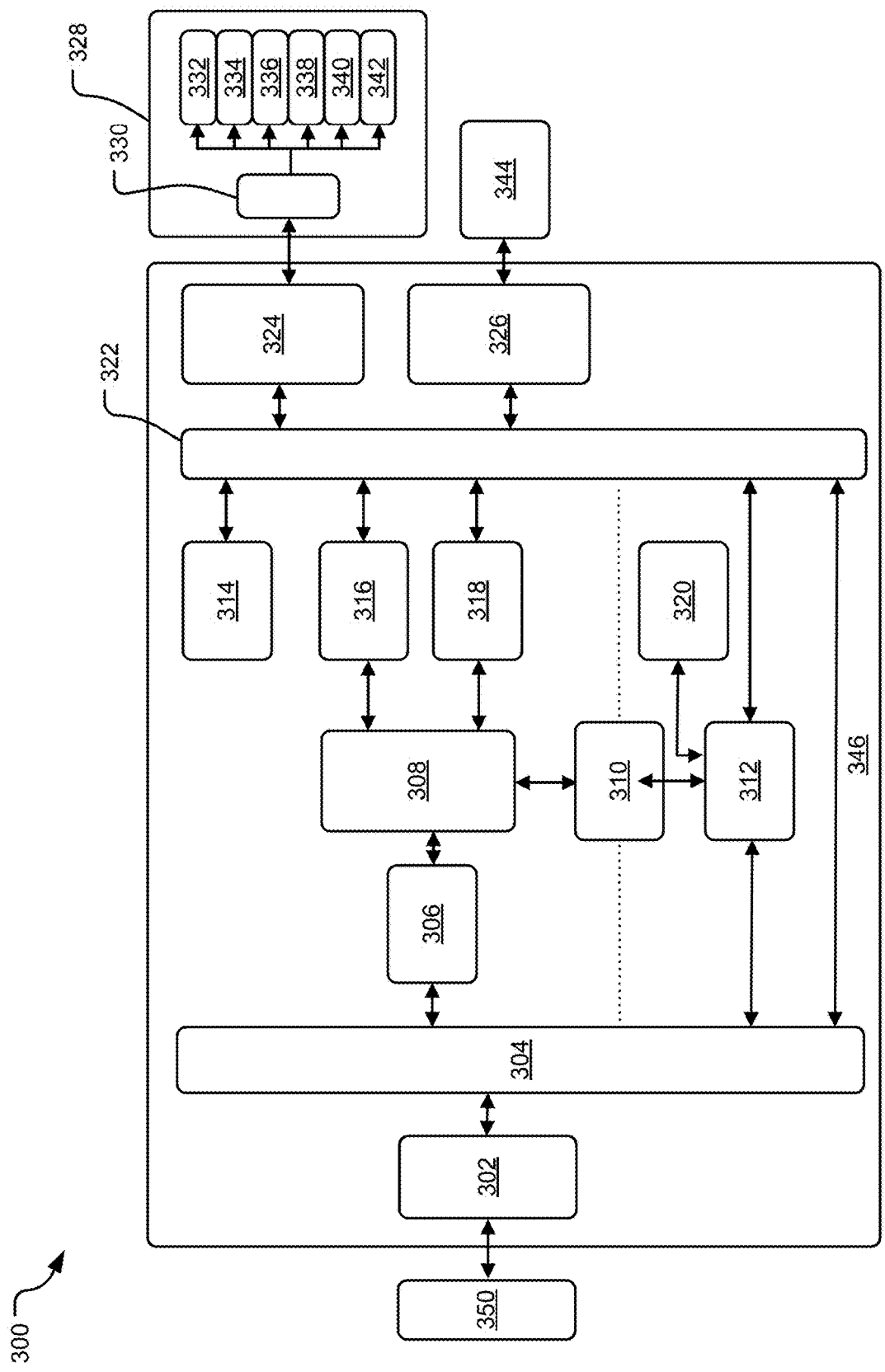
FIG. 3 illustrates an example block diagram of an alternative FPGA based system configured to support multiple storage drives.

FIG. 3 illustrates a block diagram of an alternative FPGA based system 300 configured to support multiple storage drives. The FPGA based system 300 allows a user to select plug-and-play components as required and construct a desired architectural solution to meet their requirements. The FPGA based system 300 includes an FPGA board 346 that includes a PCIe endpoint (EP) bridge 302 to communicate with a host 350. The PCIe EP bridge 302 may convert transactional layer packets (TLPs) from the host into AXI and vice versa. The PCIe EP bridge 302 may communicate via an interconnect 304 to an NVMe target controller 306 that manages host and device queues.

The NVMe target controller 306 communicates with an NVMe-to-NVMe bridge 308. The NVMe-to-NVMe bridge 308 may decode a namespace identifier in submission queue entry from the host 350. For example, if the namespace identifier is #1, the submission queue entry is forwarded to a processing subsystem (PS) that is configured as computational storage processor (CSP). On the other hand, if the namespace identifier is #2, the submission queue entry is forwarded to a drive controller. The NVMe-to-NVMe bridge 308 also communicates with a controller buffer memory (CMB) 312 via an NVMe IO control unit 310. The CMB 312 may be DRAM buffer, having for example, size of Apr. 8, 2016/etc. GB of DRAM that is available to hold the data on which the processing is to be performed in a CSP mode.

An admin queue manager 314, also be implemented using FPGA components, may be responsible for identifying the physical storage drives and advertising their capabilities to the host 350 and taking care of various NVMe administration management functions. Other components implemented using FPGA may include an NVMe hardware administrator (HA) 318 that communicates with an AXI interconnect 322, where the AXI interconnect 322 provides switching logic that helps data and control flow through AXI buses.

A processing subsystem/programming logic (PS/PL) dynamic shell 320 manages populating various dynamic computational functions as per the processing requirement coming from the host 350. The (PS/PL) dynamic shell 320 may also be configured as PS/PL accelerator to provide PS acceleration functions as well as PL acceleration function. Here a PS accelerator configuration may include a hard CPU subsystem on which a host downloaded firmware, such as eBPF, runs. A PL accelerator configuration may include various hardware-based accelerators, such as encryption accelerator, decryption accelerator, ECC accelerator, etc.

The AXI interconnect 108 communicates with an NVME SSD 344 via a PCIe root complex (RC) bridge 344 when the FPGA based system 300 is configured as a computational storage drive (CSD). Alternatively, the AXI interconnect 322 communicates with an array of drives 322-342 via another PCIe RC bridge 324 when the FPGA based system 300 is configured as a computational storage array (CSA). Specifically, the array of drives 322-342 may be configured on a chassis 328 and controlled by a PCIe switch 330.

One or more of the components 306-320 between the interconnect 304 and the interconnect 322 may be configured using FPGAs. The configuration of the FPGA based system 300 allows a user to use it in any of computational storage processor (CSP), computational storage array (CSA0, or computational storage drive (CSD) mode.

Figure 4:
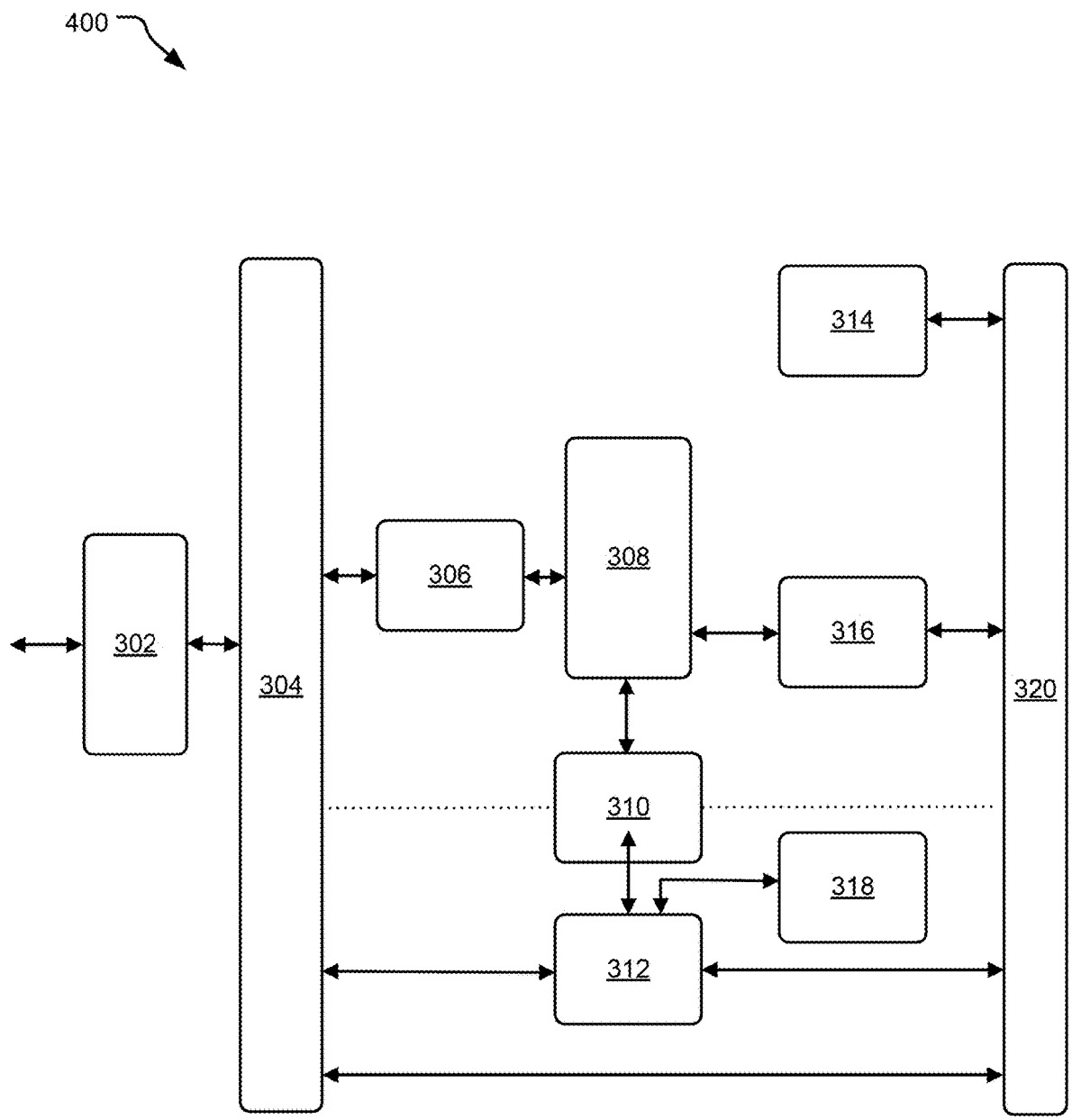
FIG. 4 illustrates an example block diagram of a CSP configuration for an FPGA based system disclosed herein.
Figure 5:
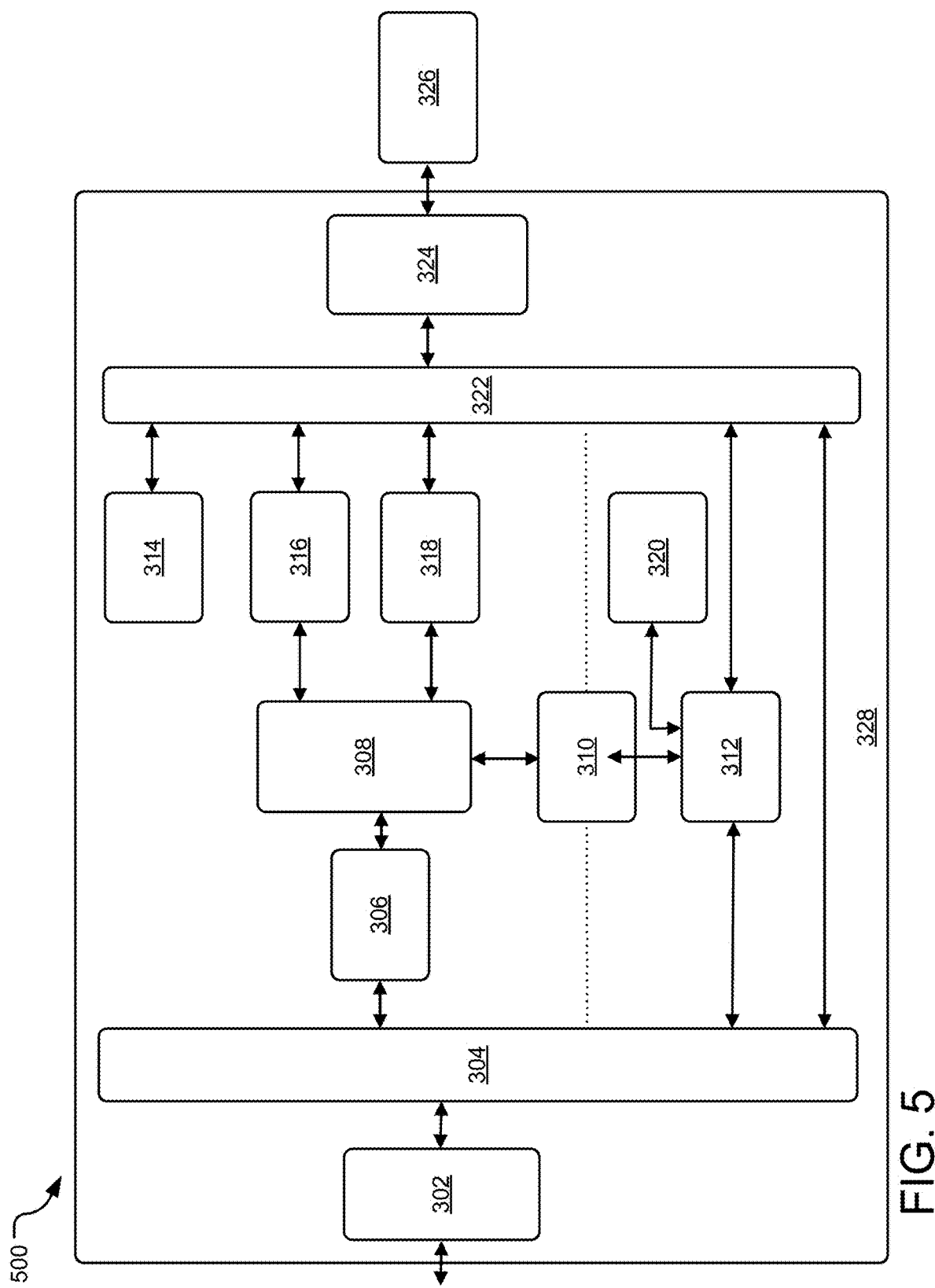
FIG. 5 illustrates an example block diagram of a CSD configuration for an FPGA based system disclosed herein.
Figure 6:
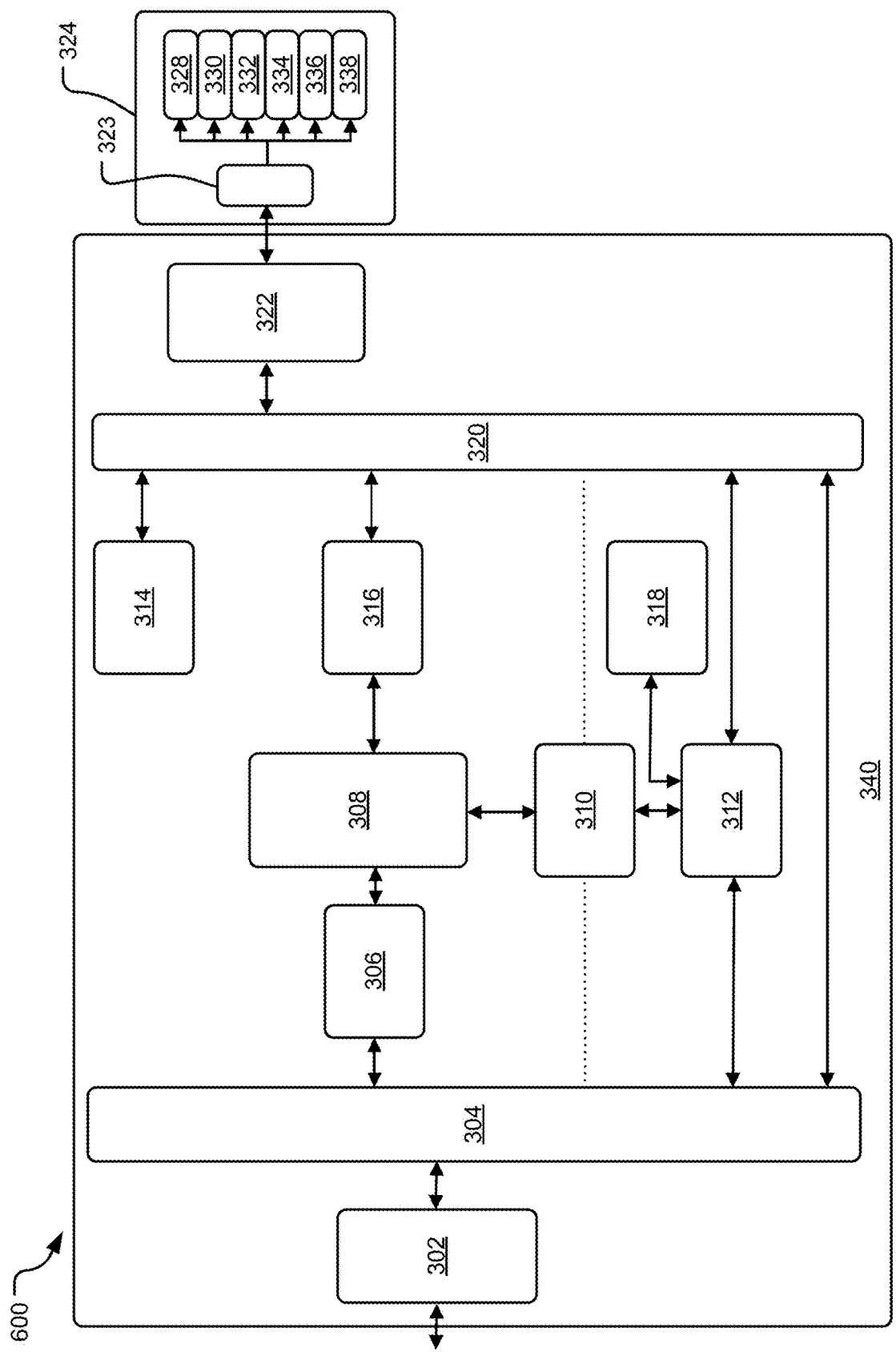
FIG. 6 illustrates an example block diagram of a computational storage array (CSA) configuration for an FPGA based system disclosed herein.
Figure 7:
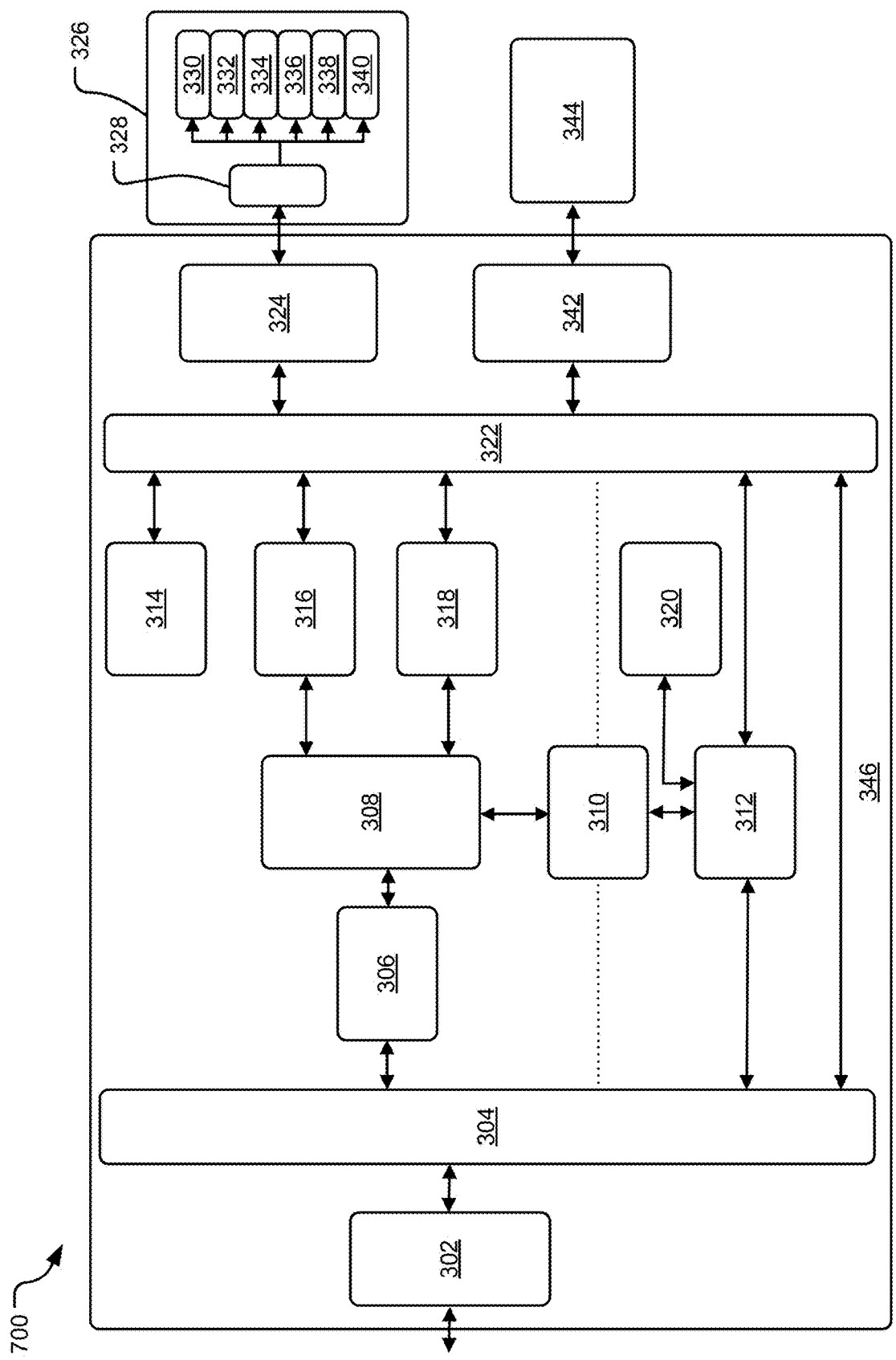
FIG. 7 illustrates an example block diagram of an FPGA based system disclosed herein implementing all CSP, CSA and CSD configurations.

FIGS. 4-7 below disclose a user using the FPGA based system 300 in one or more of CSA/CSP/CSD modes. Specifically, FIG. 4 illustrates a block diagram of a CSP configuration 400, FIG. 5 illustrates a block diagram of a CSD configuration 500, FIG. 6 illustrates a block diagram of a CSA configuration 500, and FIG. 7 illustrates a block diagram 700 of a combination of both CSD and CSA configurations. One or more components of the configurations 400-700 are similar to the components disclosed above in FIG. 3.

Figure 8:
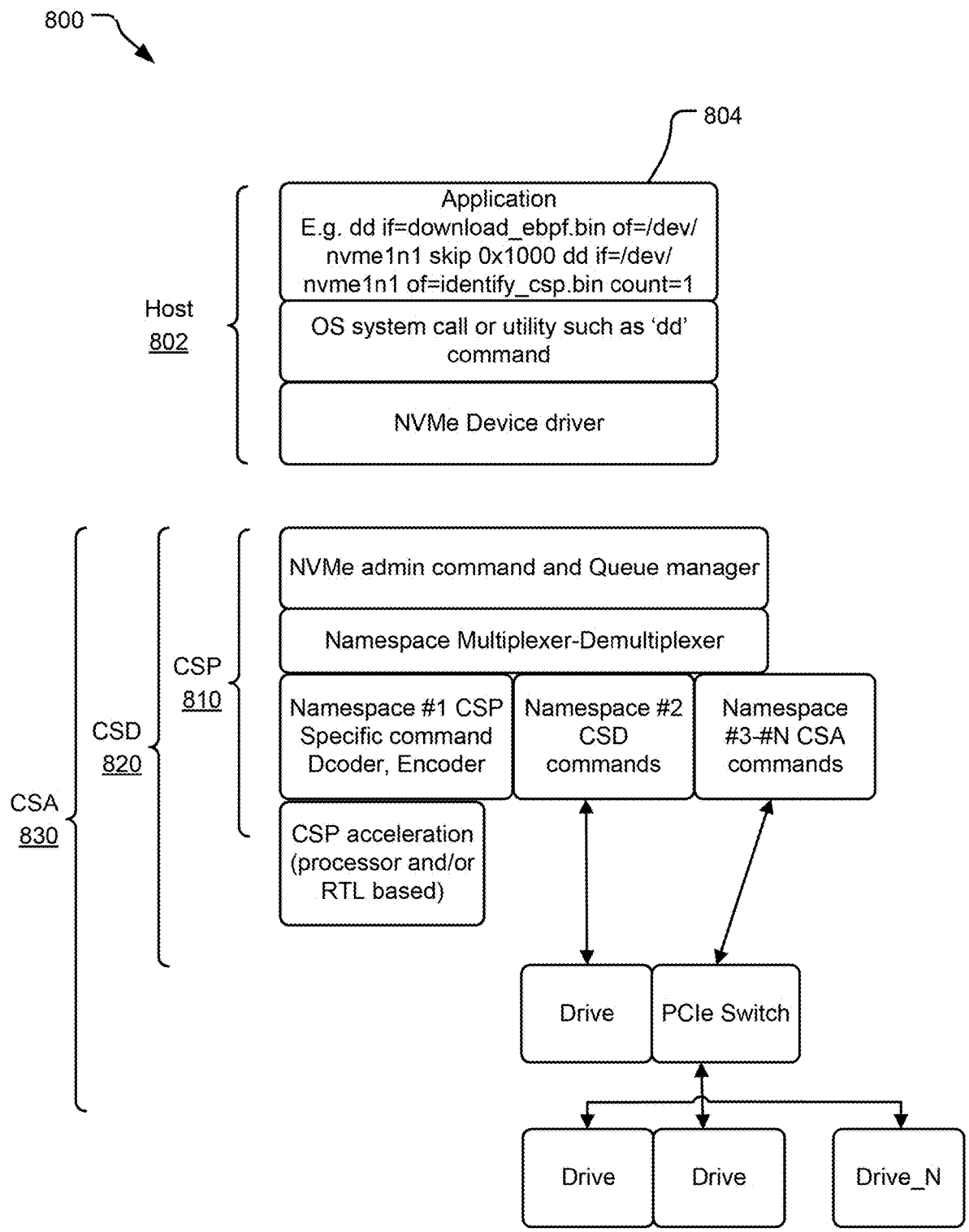
FIG. 8 illustrates an example block diagram of data flow path between a host application and a CSP to storage drives.

FIG. 8 illustrates a block diagram 800 of data flow path 800 between a host 804a application and a CSP implementation 806 using an FPGA based implementation. Specifically, the host application 804a may be based on a host 802 and it may include a binary file (.bin) with COSP specific commands and data. The binary file may transfer data and commands to a CSP namespace, specifically namespace 820a using an OS system call or utility 804b, such as a dd command 804b that calls an NVMe device drive 804c to make a call over a PCIe bridge 840.

The FPGA based CSP configuration 806 may include an NVMe admin command and queue manager 812 communicating with the host 802 over the PCIe bridge 840, a namespace multiplexer/demultiplexer 814, and namespaces 820a, 820b, and 820c. The namespace 820a may store CSP specific commands encoder/decoder that may work with a CSP acceleration module 822. The CSP acceleration module 822 may provide acceleration modules, such as decryption acceleration, encryption acceleration, etc., and it may be processor based, or it may be resistor-transistor logic (RTL) based. The namespace 820b may store CSD commands for the FPGA based system working in a CSD mode 808, and the namespace 820c may store CSA commands when the FPGA based system working in a CSA mode 810.

When working in the CSD mode 808, the namespace 820b communicates with a drive 824. On the other hand, when in CSA mode 810, the namespace 820c communicates with a number of storage drives 830 using a PCIe switch 826.

When in CSP mode 806, a dd command may be used to perform a number of operations, including configuring control registers, issuing compute commands, pushing data use for compute in local memory, downloading firmware for processors such as extended Berkeley packet filter (eBPF), downloading partial configuration compute bitstream, fetching CSP capabilities, posting computation results, reading status registers, etc.

Figure 9:
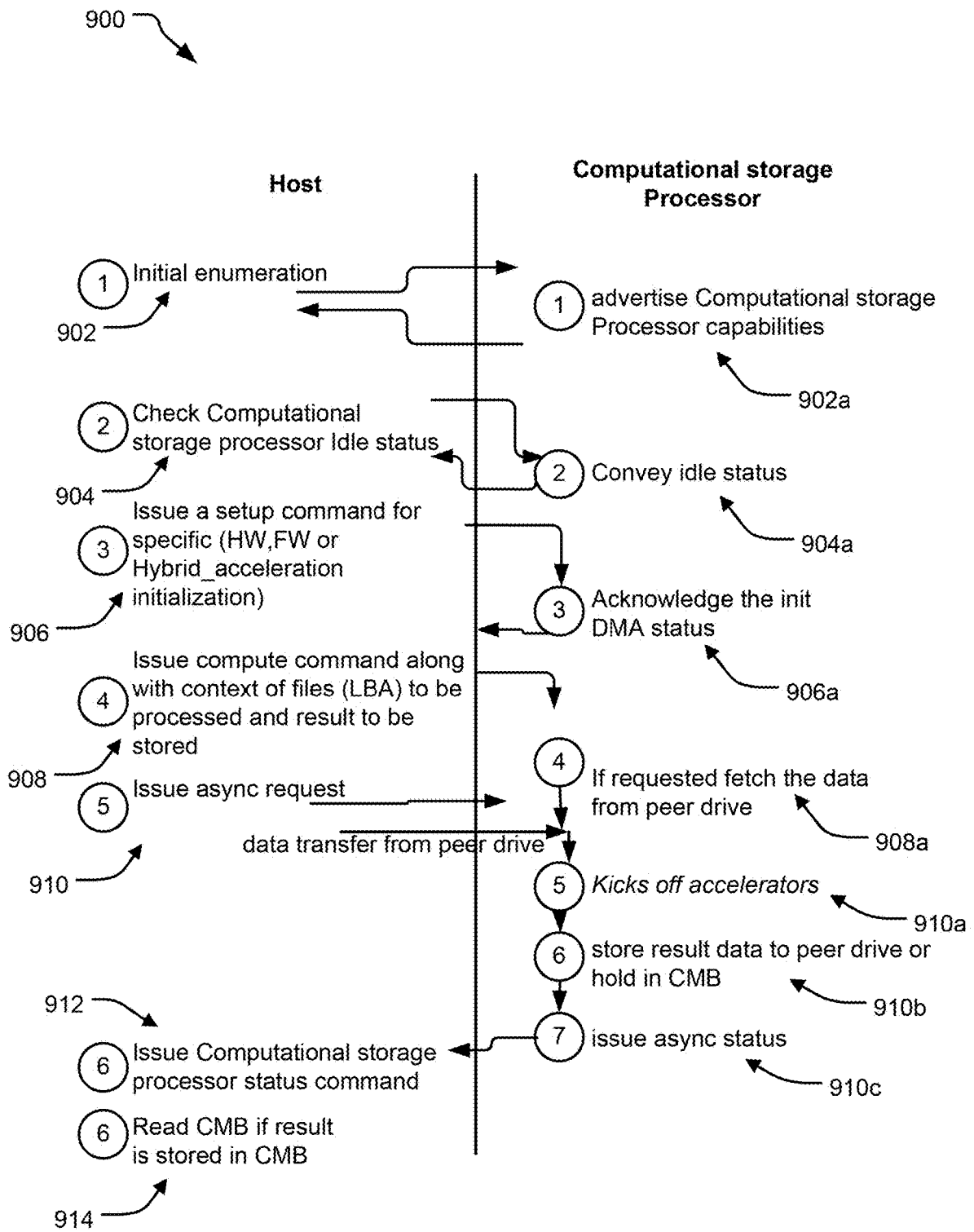
FIG. 9 illustrates an example control and data flows between a host and a CSP.

FIG. 9 illustrates a state diagram 1000 of control and data flows between a host and a CSP. At 902, the host initiates enumeration, in response at 902a, the CSP advertises its CSP capabilities. After receiving the CSP capabilities, at 904, the host checks the CSP for idle status and at 1004a, the CSP mat convey the idle status back to the host. At operation 906, the host issues a setup command for specific initialization commands for HW, FW, or hybrid acceleration and in response at 906a, the CSP acknowledge the initialization direct memory access (DMA) status.

An operation 908 issues a compute command along with context of files, the logical block addresses (LBAs), to be processed and the results to be stored. In response, at 908a, the CSP fetches the data from any peer drives as necessary. At 910, the host may issue a sync command and in response to the operations 908 and 908a, an operation 910a may kick off the requested accelerations. Subsequently, an operation 910b stores the resulting data to peer drives or holds it in the CMB, and an operation 910c issues an async command back to the host. In response, at 912, the host issues a CPS processor status command and an operation 914 reads the CMB if the results are stored in the CMB.

Figure 10:
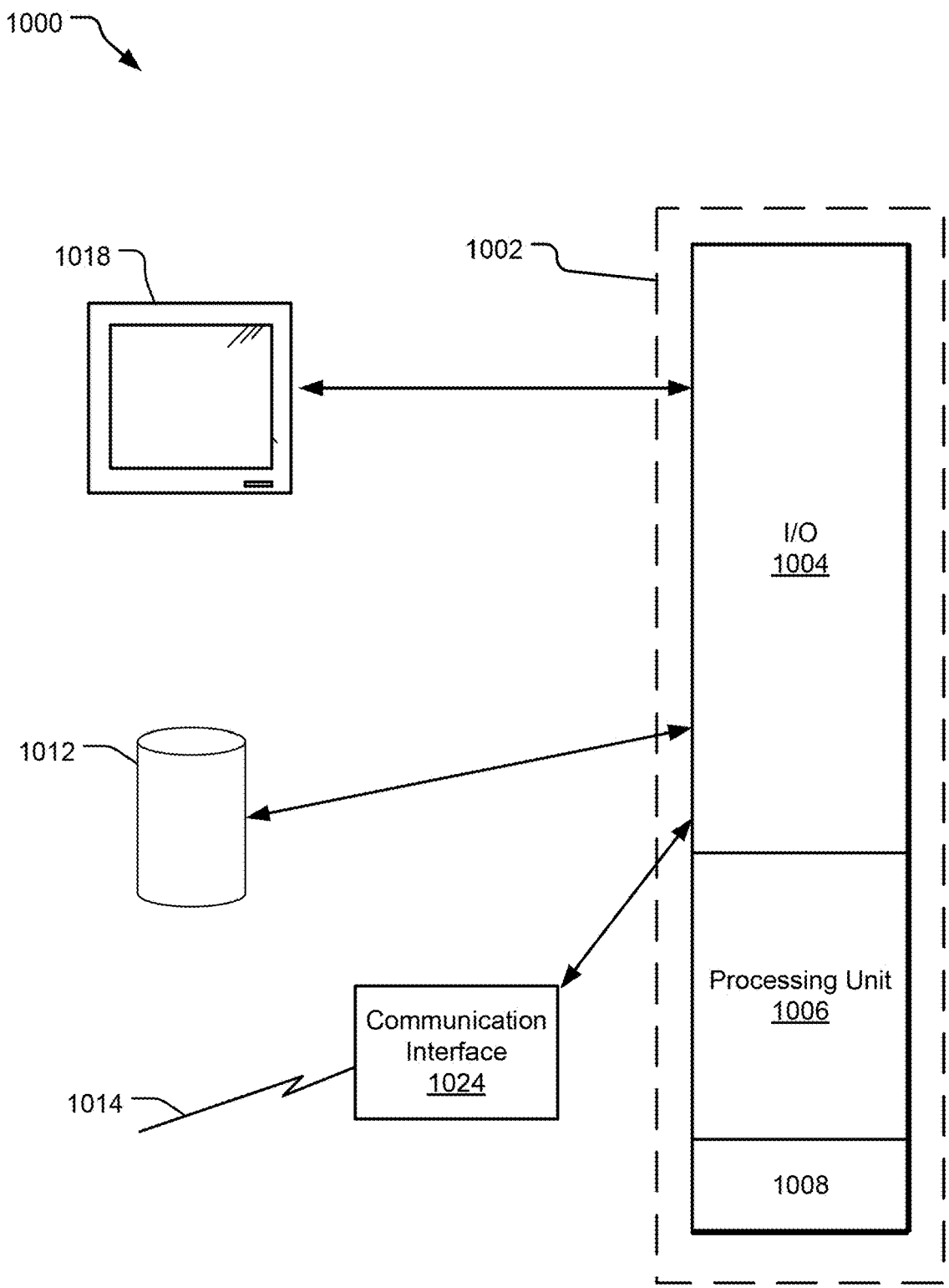
FIG. 10 illustrates an example processing system that may be useful in implementing the described technology.

FIG. 10 illustrates an example processing system 1000 that may be useful in implementing the described technology. The processing system 1000 is capable of executing a computer program product embodied in a tangible computer-readable storage medium to execute a computer process. Data and program files may be input to the processing system 1000, which reads the files and executes the programs therein using one or more processors (CPUs or GPUs). Some of the elements of a processing system 1000 are shown in FIG. 10 wherein a processor 1002 is shown having an input/output (I/O) section 1004, a Central Processing Unit (CPU) 1006, and a memory section 1008. There may be one or more processors 1002, such that the processor 1002 of the processing system 1000 comprises a single central-processing unit 1006, or a plurality of processing units. The processors may be single core or multi-core processors. The processing system 1000 may be a conventional computer, a distributed computer, or any other type of computer. The described technology is optionally implemented in software loaded in memory 1008, a storage unit 1012, and/or communicated via a wired or wireless network link 1014 on a carrier signal (e.g., Ethernet, 3G wireless, 8G wireless, LTE (Long Term Evolution)) thereby transforming the processing system 1000 in FIG. 10 to a special purpose machine for implementing the described operations. The processing system 1000 may be an application specific processing system configured for supporting a distributed ledger. In other words, the processing system 1000 may be a ledger node.

The I/O section 1004 may be connected to one or more user-interface devices (e.g., a keyboard, a touch-screen display unit 1018, etc.) or a storage unit 1012. Computer program products containing mechanisms to effectuate the systems and methods in accordance with the described technology may reside in the memory section 1008 or on the storage unit 1012 of such a system 1000.

A communication interface 1024 is capable of connecting the processing system 1000 to an enterprise network via the network link 1014, through which the computer system can receive instructions and data embodied in a carrier wave. When used in a local area networking (LAN) environment, the processing system 1000 is connected (by wired connection or wirelessly) to a local network through the communication interface 1024, which is one type of communications device. When used in a wide-area-networking (WAN) environment, the processing system 1000 typically includes a modem, a network adapter, or any other type of communications device for establishing communications over the wide area network. In a networked environment, program modules depicted relative to the processing system 1000 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 1008 and/or the storage unit 1012 and executed by the processor 1002. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 1008 and/or the storage unit 1012 and executed by the processor 1002.

The processing system 1000 may be implemented in a device, such as a user device, storage device, IoT device, a desktop, laptop, computing device. The processing system 1000 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system, comprising:
one or more storage drives;
an FPGA based controller board; and
a flash memory configured to store one or more FPGA executable binary libraries;
wherein the FPGA based controller board comprising:
a drive logic detector configured to detect the type of the one or more of the storage drives;
an FPGA executable libraries configuration module configured to select one or more of the FPGA executable binary libraries from the flash memory based on the type of the one or more of the storage drives to implement an FPGA based interface for communication between the one or more storage drives and a host.

2. The system of claim 1, wherein the drive logic detector is further configured to detect the type of the one or more of the storage drives by analyzing a bitstream from the one or more of the storage drives on a bay interconnecting the one or more storage drives to the FPGA based controller board.

3. The system of claim 1, wherein the FPGA based interface includes one or more controller bridges implemented using FPGAs.

4. The system of claim 1, wherein the FPGA based interface includes one or more storage drive controllers implemented using FPGAs.

5. The system of claim 1, wherein the FPGA based controller board further comprising an FPGA implemented accelerator configured to accelerate at least one of data compression, data encoding, data decoding of data stored on the storage drives.

6. The system of claim 5, wherein the FPGA based controller board further comprising an acceleration library manager configured to select one or more acceleration libraries based on the type of the storage drive to configure the FPGA implemented accelerator.

7. The system of claim 1, wherein the FPGA based controller board further comprising an NVMe target controller configured to expose a namespace to the host based on the type of storage drive.

8. The system of claim 1, wherein the FPGA based controller board further comprising a controller memory buffer implemented using FPGAs and configured based on the type of the storage drives.

9. A storage device, comprising:
one or more storage drives;
an FPGA based controller board; and
a flash memory configured to store one or more FPGA executable binary libraries;
wherein the FPGA based controller board comprising:
a drive logic detector configured to detect the type of the one or more of the storage drives, wherein the drive logic detector is further configured to detect the type of the one or more of the storage drives by analyzing a bitstream from the one or more of the storage drives on a bay interconnecting the one or more storage drives to the FPGA based controller board;
an FPGA executable libraries configuration module configured to select one or more of the FPGA executable binary libraries from the flash memory based on the type of the one or more of the storage drives to implement an FPGA based interface for communication between the one or more storage drives and a host.

10. The storage device of claim 9, wherein the FPGA based interface includes one or more controller bridges implemented using FPGAs.

11. The storage device of claim 9, wherein the FPGA based interface includes one or more storage drive controllers implemented using FPGAs.

12. The storage device of claim 9, wherein the FPGA based controller board further comprising an FPGA implemented accelerator configured to accelerate at least one of data compression, data encoding, data decoding of data stored on the storage drives.

13. The storage device of claim 12, wherein the FPGA based controller board further comprising an acceleration library manager configured to select one or more acceleration libraries based on the type of the storage drive to configure the FPGA implemented accelerator.

14. The storage device of claim 9, wherein the FPGA based controller board further comprising an NVMe target controller configured to expose a namespace to the host based on the type of storage drive.

15. The storage device of claim 9, wherein the FPGA based controller board further comprising a controller memory buffer implemented using FPGAs and configured based on the type of the storage drives.

16. A device, comprising:
an FPGA based controller board; and
a flash memory configured to store one or more FPGA executable binary libraries;
wherein the FPGA based controller board comprising:
a drive logic detector configured to detect type of one or more of storage drives;
an FPGA executable libraries configuration module configured to select one or more of the FPGA executable binary libraries from the flash memory based on the type of the one or more of the storage drives to implement an FPGA based interface for communication between the one or more storage drives and a host.

17. The device of claim 16, wherein the drive logic detector is further configured to detect the type of the one or more of the storage drives by analyzing a bitstream from the one or more of the storage drives (on a bay interconnecting the one or more storage drives to the FPGA based controller board; and
wherein the FPGA based interface includes one or more controller bridges implemented using FPGAs.

18. The device of claim 16, wherein the FPGA based interface includes one or more storage drive controllers implemented using FPGAs.

19. The device of claim 16, wherein the FPGA based controller board further comprising an FPGA implemented accelerator configured to accelerate at least one of data compression, data encoding, data decoding of data stored on the storage drives.

20. The device of claim 19, the FPGA based controller board further comprising an acceleration library manager configured to select one or more acceleration libraries based on the type of the storage drive to configure the FPGA implemented accelerator.

\* \* \* \* \*